June 3, 1969     R. SEITZ     3,447,985
METHOD FOR MACHINING FRAGILE CRYSTALS
Original Filed June 30, 1965
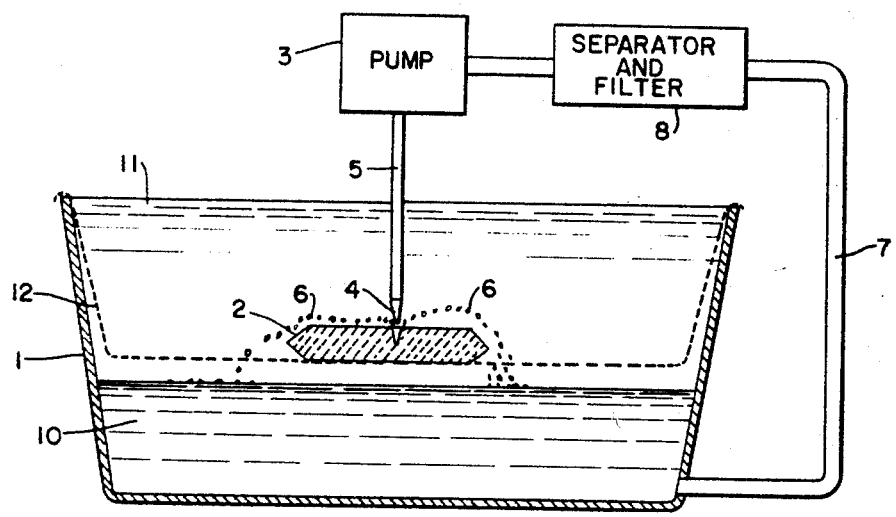
INVENTOR
RUSSELL SEITZ
BY
*Nolte and Nolte*
ATTORNEYS

United States Patent Office 3,447,985
Patented June 3, 1969

---

3,447,985
METHOD FOR MACHINING FRAGILE CRYSTALS
Russell Seitz, Elberon, N.J., assignor, by direct and mesne assignments, of one-third to Elton Industries, Inc., Oyster Bay Cove, N.Y., a corporation of New York
Continuation of application Ser. No. 468,275, June 30, 1965. This application Sept. 24, 1965, Ser. No. 494,298
Int. Cl. C23f *1/04;* B01j *1/00;* B01f *1/00*
U.S. Cl. 156—12     5 Claims

ABSTRACT OF THE DISCLOSURE

A body of a solid substance is shaped by supporting the body in a first fluid which is non-solvent with respect to the substance and directing a stream of a second fluid onto a surface of the body, the second fluid being a solvent for the substance and being immiscible with the first fluid.

---

This application is a continuation of my now abandoned application Ser. No. 468,275, filed June 30, 1965.

This invention relates to a method and apparatus for machining and shaping crystals. More particularly, this invention relates to a method and apparatus for performing machining operations on fragile crystals wherein under existing methods of machining, these crystals are subject to fracture.

Under present methods in machining crystals and other fragile materials utilizing precision high speed drills, it is not possible to shape certain crystals such as sodium chloride since the pressure exerted by drills or other tools generally cause the crystal surface to fracture resulting in the shattering of the crystal.

It can therefore be seen that the development of an apparatus and a method for drilling holes and performing other machining operations on fragile crystals, such as sodium chloride crystals, would permit new uses to be developed for such crystals in industrial and scientific applications.

It is therefore an object of the present invention to provide a method for performing machining operations on fragile crystals wherein the crystals which are being worked on are not shattered.

It is a further object of this invention to provide a method for performing machining operations on fragile crystals which does not use mechanical force to perform the operation but rather uses a high velocity, intense fluid stream.

It is a further object of this invention to provide a method for machining a fragile crystal to obtain a smooth and precision surface finish on the crystal, by control of the machining operation, said surface being free from strain and fracture and produced at a relatively low cost.

In the present invention the crystal workpiece is initially suspended in a bath of a first fluid in which the crystal is insoluble. A second fluid, having a specific gravity either greater or less than the insoluble fluid, and immiscible with the first fluid, is added to the bath. The second fluid is also capable of dissolving the crystal.

A fine, intense stream of the second soluble fluid is then directed in a controlled manner onto the surface of the crystal so that it will dissolve that portion of the crystal upon which it impinges. Upon dissolving a portion of the surface of the crystal or workpiece, the impinging fluid will break into globules, as this fluid is immiscible with the fluid in which the workpiece is suspended. These globules being of different specific gravity than the supporting fluid, will return to the soluble fluid in the bath and recoalesce. The soluble fluid can then be filtered to remove the workpiece particles in solution and thus recirculated by a pump to be once again used as the impinging stream on the workpiece.

For a clearer understanding and appreciation of the objects and operation of this invention, reference may be had to the accompanying specification with reference to the following figure in which:

The figure is one embodiment of the crystal machining apparatus.

A fluid 10 is placed along the bottom portion of a tank 1. A fluid 11 which is immiscible with fluid 10, and has a lower specific gravity than fluid 10, is placed thereabove. A crystal workpiece 2 is supported on a perforated tray 12 so that it is surrounded only by fluid 11. A high pressure pump 3 is provided having an outlet tube 5 having a nozzle 4 coupled to its end for pumping a fine stream of fluid 10 against a surface of crystal 2. Fluid 10 is selected as a solvent for crystal 2. Fluid 11 is selected because of its non-solvent properties with crystal 2. For water soluble crystals, fluid 10 may be selected as water while fluid 11 may be a liquid Freon ("Freon" being defined in Hackh's Chemical Dictionary as the trademark for halogenated hydrocarbons containing one or more fluorine atoms).

The position of nozzle 4 with respect to crystal 2 may be controlled with great precision by machinery, which is now well known in the art, to perform any desired series of operations upon the workpiece. This can be done automatically by means of program controlled machinery.

Initially, the crystal workpiece is immersed in fluid 11 until a protective film is formed around the surface of the crystal. As shown in the figure, the end of nozzle 4 is held close to the top surface of the workpiece. When the fluid under high pressure leaves the nozzle and impinges at high velocity upon the surface of the crystal, the film formed on the surface by fluid 11 parts sufficiently to permit the fluid 10 to being dissolving the surface. As the solvent fluid directed by nozzle 4 contacts the surface of crystal 2, it begins to dissolve only that portion of the crystal nearest the nozzle outlet since the protective film covering the crystal prevents remote surfaces from becoming affected. The fluid 10 exits from the crystal as globules 6 containing a portion of the crystal in solution globules 6 travel along the top surface film of crystal 2 and descend toward the pool of fluid 10 at the bottom of the tank where they go back into solution.

Fluid 10 may be recycled back to pump 3 along conduit 7, which taps into the base of bath 1.

The fluid from conduit 7 is fed into a separator 8 which may distill the fluid 10 out of solution before feeding it to pump 3. Separator 8 may also cool the solution sufficiently to separate a portion of the crystal material out by saturation and precipitation. In any event, separator 8 permits recovery of both the crystal material and fluid 10. The separator need only remove enough crystal material to maintain the fluid directed on the crystal below saturation so that it will be capable of dissolving the desired portions of the crystal.

The nozzle 4 may be defined in a variety of configurations so as to be adapted to perform many different machining operations. Moreover, both the workpiece or the pump may be indexed in any desired direction during the machining operation.

It is also within the scope of this invention to provide that the immiscible fluid have greater specific gravity than fluid 10 so that the workpiece will be in the lower fluid along with the nozzle extending from the pump. The globules will then rise and coalesce with the bottom surface of upper fluid.

It will be obvious that many variations of detail may be used without departing from the basic scope of this invention which is defined by the appended claims.

What I claim is:

1. A method of shaping a crystal, comprising fixedly supporting the crystal in a first liquid which is non-solvent with respect to the crystal and which will wet the crystal and directing a narrow high velocity stream of a second liquid against only a portion of the surface of the crystal, from a point closely adjacent to said portion the second liquid being a solvent for the crystal and being immiscible with the first liquid, whereby the second liquid dissolves only that portion of the surface of the crystal against which it is directed, and the first and the second liquids being of different specific gravities and thereby the liquid of lesser specific gravity forming a layer overlying the liquid of greater specific gravity and the portion of the second liquid directed against the crystal forming globules containing dissolved therein portions of the crystal which globules migrate to and merge with the layer constituted of the second liquid.

2. A method according to claim 1, further comprising separating from the layer of the second liquid at least a portion of the crystal dissolved therein.

3. A method according to claim 2, in which the second liquid from the layer thereof is circulated through a separating zone spaced from the layer of the second liquid and in which zone said separating is effected.

4. A method according to claim 3, in which said separating comprises cooling said liquid sufficiently to precipitate therefrom at least a portion of the dissolved crystal.

5. A method according to claim 4, in which said crystal is of sodium chloride, said first liquid is a liquid halogenated hydrocarbon containing at least one fluorine atom and said second liquid is water.

References Cited

UNITED STATES PATENTS

| | | | |
|---|---|---|---|
| 2,585,473 | 2/1952 | Kennedy | 23—310 |
| 3,083,126 | 3/1963 | Griffiths | 134—25 |
| 3,092,515 | 6/1963 | Pike et al. | 134—25 |
| 3,257,246 | 6/1966 | Grosvalet et al. | 148—175 |

JACOB H. STEINBERG, *Primary Examiner.*

U.S. Cl. X.R.

23—309; 134—34; 156—2, 17, 19, 345